US012711920B2

(12) United States Patent
Kim et al.

(10) Patent No.: US 12,711,920 B2
(45) Date of Patent: Aug. 18, 2026

(54) PIXEL CIRCUIT, DISPLAY DEVICE INCLUDING THE SAME, AND ELECTRONIC DEVICE INCLUDING THE SAME

(71) Applicant: Samsung Display Co., Ltd., Yongin-si (KR)

(72) Inventors: Kyungho Kim, Yongin-si (KR); Dong Hee Shin, Yongin-si (KR); Yunmi Kim, Yongin-si (KR); Hyeongseok Kim, Yongin-si (KR); Doyeong Park, Yongin-si (KR); Junghwan Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/266,077

(22) Filed: Jul. 10, 2025

(65) Prior Publication Data

US 2026/0162608 A1 Jun. 11, 2026

(30) Foreign Application Priority Data

Dec. 6, 2024 (KR) ........................ 10-2024-0180965

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0819* (2013.01); *G09G 2300/0852* (2013.01); *G09G 2300/0861* (2013.01); *G09G 2310/08* (2013.01)

(58) Field of Classification Search
None
See application file for complete search history.

(56) References Cited

U.S. PATENT DOCUMENTS

2021/0366383 A1 11/2021 Ma

FOREIGN PATENT DOCUMENTS

KR 10-2016-0007862 A 1/2016
KR 10-2019-0067344 A 6/2019
KR 10-2022-0089336 A 6/2022

*Primary Examiner* — Aneeta Yodichkas
(74) *Attorney, Agent, or Firm* — Womble Bond Dickinson (US) LLP

(57) ABSTRACT

A pixel circuit includes: a first transistor comprising a gate electrode connected to a first node, a first electrode connected to a second node, and a second electrode connected to a third node; a second transistor comprising a gate electrode receiving a gate signal, a first electrode receiving a reference voltage or a data signal, and a second electrode connected to the first node; a third transistor comprising a gate electrode receiving a first emission signal, a first electrode receiving an initialization voltage, and a second electrode connected to a fourth node; a fourth transistor comprising a gate electrode receiving the first emission signal, a first electrode receiving a first power voltage, and a second electrode connected to the second node; and a light-emitting element comprising a first electrode connected to the fourth node and a second electrode receiving a second power voltage.

20 Claims, 8 Drawing Sheets

PIXEL CIRCUIT, DISPLAY DEVICE INCLUDING THE SAME, AND ELECTRONIC DEVICE INCLUDING THE SAME

CROSS-REFERENCE TO RELATED APPLICATION

The present application claims priority to and the benefit of Korean Patent Application No. 10-2024-0180965, filed on Dec. 6, 2024, in the Korean Intellectual Property Office, the entire disclosure of which is incorporated herein by reference.

BACKGROUND

1. Field

Aspects of some embodiments of the present disclosure relate to a pixel circuit, a display device including the same, and an electronic device including the same.

2. Description of the Related Art

A pixel includes a light-emitting element and a transistor (or transistors) for transmitting current corresponding to a data signal to the light-emitting element.

The threshold voltage of a transistor has variations and may also vary according to use. Thus, in a display device including pixels, the threshold voltage of a transistor may be compensated for through various compensation techniques (e.g., an internal compensation technique, an external compensation technique, and the like). For example, in case that a display device uses an internal compensation technique, data signals may be written to pixels and, at the same time, the threshold voltage of a transistor may be compensated for.

The above information disclosed in this Background section is only for enhancement of understanding of the background and therefore the information discussed in this Background section does not necessarily constitute prior art.

SUMMARY

Aspects of some embodiments include a pixel circuit, a display device including the same, and an electronic device including the same. Aspects of embodiments according to the present disclosure are not limited to the above-described characteristics, and other unmentioned characteristics of embodiments according to the present disclosure can be understood by the following description and will be more clearly understood by embodiments of the disclosure. In addition, it will be appreciated that the characteristics of embodiments according to the present disclosure can be realized by the means and combinations thereof indicated in the claims.

According to some embodiments of the present disclosure, a pixel circuit includes a first transistor including a gate electrode connected to a first node, a first electrode connected to a second node, and a second electrode connected to a third node, a second transistor including a gate electrode configured to receive a gate signal, a first electrode configured to receive a reference voltage or a data signal, and a second electrode connected to the first node, a third transistor including a gate electrode configured to receive a first emission signal, a first electrode configured to receive an initialization voltage, and a second electrode connected to a fourth node, a fourth transistor including a gate electrode configured to receive the first emission signal, a first electrode configured to receive a first power voltage, and a second electrode connected to the second node, a fifth transistor including a gate electrode configured to receive a second emission signal, a first electrode connected to the third node, and a second electrode connected to the fourth node, a first capacitor including a first electrode connected to the first node and a second electrode connected to the third node, a second capacitor including a first electrode connected to the first power voltage and a second electrode connected to the third node, and a light-emitting element including a first electrode connected to the fourth node and a second electrode configured to receive a second power voltage.

According to some embodiments, the first transistor may include a first gate electrode connected to the first node and a second gate electrode configured to receive the first power voltage.

According to some embodiments, the second transistor may be configured to receive a reference voltage or a data signal through a single line.

According to some embodiments, the first transistor, the second transistor, the third transistor, and the fifth transistor may be N-channel metal oxide semiconductor (NMOS) transistors, and the fourth transistor may be a P-channel metal oxide semiconductor (PMOS) transistor.

According to some embodiments, the gate signal may be a high signal at time points at which the second transistor receives the reference voltage and the data signal.

According to some embodiments, at a time point at which the light-emitting element emits light, the first emission signal may be a low signal, and the second emission signal may be a high signal.

According to some embodiments of the present disclosure, a display device includes a scan driver configured to transmit a plurality of scan signals to a plurality of scan lines, a data driver configured to transmit a plurality of data signals to a plurality of data lines, an emission driver configured to transmit a plurality of emission signals to a plurality of emission control lines, and a pixel unit including a plurality of pixel circuits, wherein each of the plurality of pixel circuits emits light according to a corresponding data signal to display an image, the pixel circuit including a first transistor including a gate electrode connected to a first node, a first electrode connected to a second node, and a second electrode connected to a third node, a second transistor including a gate electrode configured to receive a gate signal, a first electrode configured to receive a reference voltage or a data signal, and a second electrode connected to the first node, a third transistor including a gate electrode configured to receive a first emission signal, a first electrode configured to receive an initialization voltage, and a second electrode connected to a fourth node, a fourth transistor including a gate electrode configured to receive the first emission signal, a first electrode configured to receive a first power voltage, and a second electrode connected to the second node, a fifth transistor including a gate electrode configured to receive a second emission signal, a first electrode connected to the third node, and a second electrode connected to the fourth node, a first capacitor including a first electrode connected to the first node and a second electrode connected to the third node, a second capacitor including a first electrode connected to the first power voltage and a second electrode connected to the third node, and a light-emitting element including a first electrode connected to the fourth node and a second electrode configured to receive a second power voltage.

According to some embodiments, the scan driver may be configured to simultaneously transmit the scan signals to the plurality of pixel circuits in an initialization period and a compensation period, and to sequentially transmit the scan signals to the plurality of pixel circuits in a data writing period.

According to some embodiments, the emission driver may be configured to simultaneously transmit the first emission signal to the plurality of pixel circuits in an initialization period and a compensation period and to sequentially transmit the first emission signal to the plurality of pixel circuits in an emission period, and to simultaneously transmit the second emission signal to the plurality of pixel circuits.

According to some embodiments, the first transistor may include a first gate electrode connected to the first node and a second gate electrode configured to receive the first power voltage.

According to some embodiments, the second transistor may be configured to receive a reference voltage or a data signal through a single line.

According to some embodiments, the first transistor, the second transistor, the third transistor, and the fifth transistor may be N-channel metal oxide semiconductor (NMOS) transistors, and the fourth transistor may be a P-channel metal oxide semiconductor (PMOS) transistor.

According to some embodiments, the gate signal may be a high signal at time points at which the second transistor receives the reference voltage and the data signal.

According to some embodiments, at a time point at which the light-emitting element emits light, the first emission signal may be a low signal, and the second emission signal may be a high signal.

According to some embodiments of the present disclosure, an electronic device includes at least one memory, at least one processor configured to execute an application stored in the at least one memory, and a display module configured to process an image data signal and output image information, wherein the display module includes at least one pixel circuit, wherein the at least one pixel circuit each includes a first transistor including a gate electrode connected to a first node, a first electrode connected to a second node, and a second electrode connected to a third node, a second transistor including a gate electrode configured to receive a gate signal, a first electrode configured to receive a reference voltage or a data signal, and a second electrode connected to the first node, a third transistor including a gate electrode configured to receive a first emission signal, a first electrode configured to receive an initialization voltage, and a second electrode connected to a fourth node, a fourth transistor including a gate electrode configured to receive the first emission signal, a first electrode configured to receive a first power voltage, and a second electrode connected to the second node, a fifth transistor including a gate electrode configured to receive a second emission signal, a first electrode connected to the third node, and a second electrode connected to the fourth node, a first capacitor including a first electrode connected to the first node and a second electrode connected to the third node, a second capacitor including a first electrode connected to the first power voltage and a second electrode connected to the third node, and a light-emitting element including a first electrode connected to the fourth node and a second electrode configured to receive a second power voltage.

According to some embodiments, the first transistor may include a first gate electrode connected to the first node and a second gate electrode configured to receive the first power voltage.

According to some embodiments, the second transistor may be configured to receive a reference voltage or a data signal through a single line.

According to some embodiments, the first transistor, the second transistor, the third transistor, and the fifth transistor may be N-channel metal oxide semiconductor (NMOS) transistors, and the fourth transistor may be a P-channel metal oxide semiconductor (PMOS) transistor.

According to some embodiments, the gate signal may be a high signal at time points at which the second transistor receives the reference voltage and the data signal.

According to some embodiments, at a time point at which the light-emitting element emits light, the first emission signal may be a low signal, and the second emission signal may be a high signal.

Other aspects, features, and characteristics will become apparent from the following drawings, the claims, and the detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings in which.

DETAILED DESCRIPTION

Figure 1:
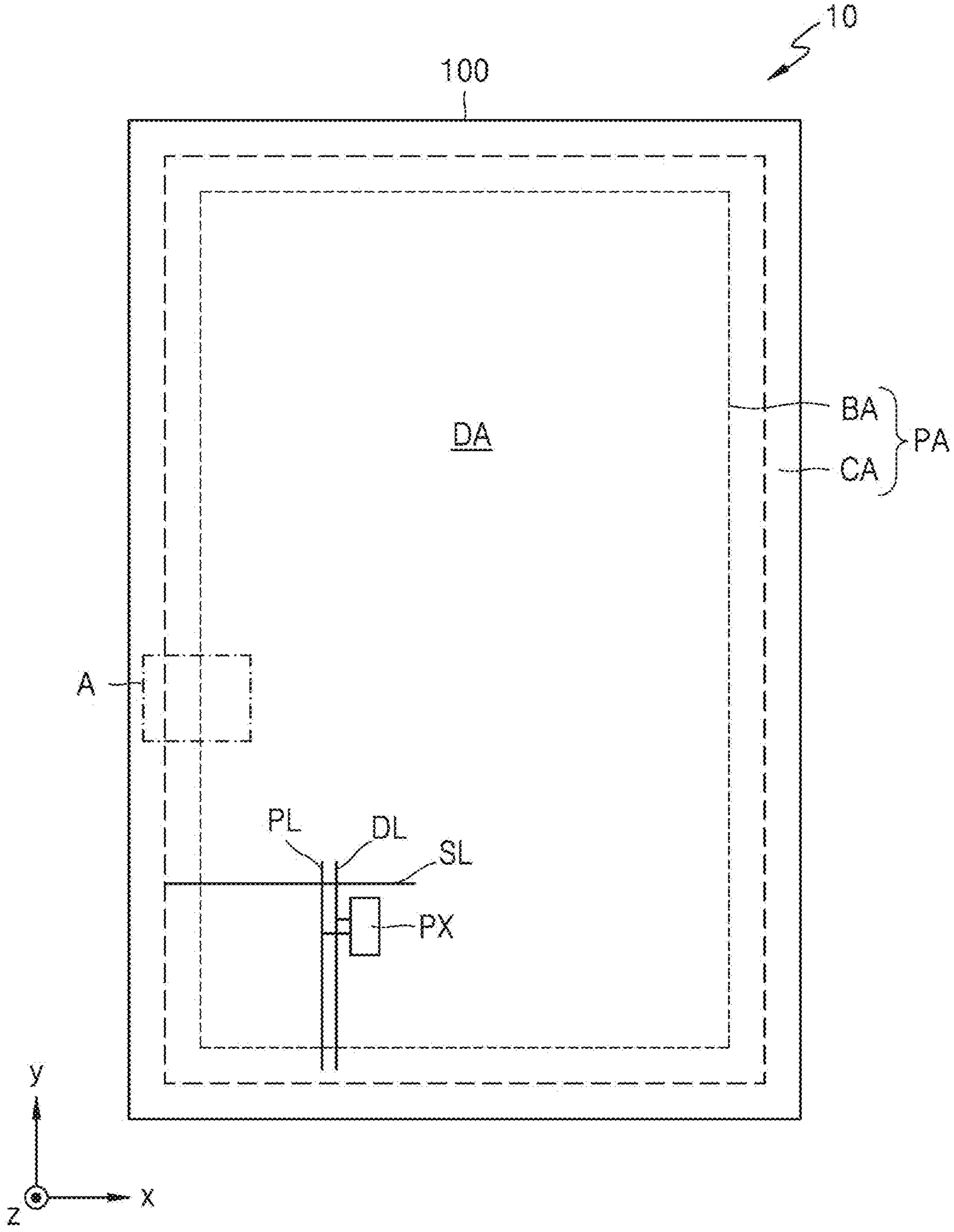
FIG. 1 is a schematic plan view of a display device according to an embodiment.

The disclosure may have various modifications and various embodiments, and specific embodiments are illustrated in the drawings and are described in detail in the detailed description. Effects and features of the disclosure and methods of achieving the same will become apparent with reference to embodiments described in detail with reference to the drawings. However, the disclosure is not limited to the embodiments described below, and may be implemented in various forms.

In the following embodiments, the terms "first" and "second" are not used in a limited sense and are used to distinguish one component from another component.

In the following embodiments, an expression used in the singular encompasses the expression in the plural, unless it has a clearly different meaning in the context.

In the following embodiments, it will be further understood that the terms "comprise" and/or "have" used herein specify the presence of stated features or components, but do not preclude the presence or addition of one or more other features or components.

It will be understood that, when a unit, region, or element is referred to as being "on" another unit, area, or element, it can be directly on the other unit, region, or element, and it may also mean that intervening units, regions, or elements may be present therebetween.

In the embodiments below, terms such as connect or combine do not necessarily imply a direct and/or fixed connection or combination of two members, unless the context clearly indicates otherwise, and do not exclude the presence of another member between the two members.

In the drawings, for convenience of description, sizes of components may be exaggerated or reduced. For example, because sizes and/or thicknesses of components in the drawings are arbitrarily illustrated for convenience of explanation, the disclosure is not necessarily limited thereto.

In the following embodiments, the term "ON" used in connection with a device state may refer to an activated state of a device, and the term "OFF" may refer to an inactivated state of the device. The term "ON" used in connection with a signal received by a device may refer to a signal that activates the device, and the term "OFF" may refer to a signal that inactivates the device. The device may be activated by a high voltage or a low voltage. For example, a P-type transistor may be activated by a low voltage. An N-type transistor may be activated by a high voltage. Therefore, it is necessary to understood that "ON" voltages for P-type and N-type transistors are opposite (low vs. high) voltage levels.

In the embodiments below, when one element is referred to as being "connected to" another element, this includes both a case in which the element is directly connected to the other element or another element is interposed therebetween.

Hereinafter, aspects of some embodiments of the present disclosure will be described in more detail with reference to the accompanying drawings, and in the following description with reference to the drawings, like reference numerals refer to like or corresponding components and some redundant descriptions thereof may be omitted.

FIG. 1 is a schematic plan view of a display device according to some embodiments.

As illustrated in FIG. 1, the display device according to some embodiments of the disclosure may include a display panel 10. The display device may be any display device that includes the display panel 10. For example, the display device may include various devices, such as a smartphone, a tablet, a laptop, a television, or a billboard. The display device according to some embodiments of the disclosure may include thin film transistors, capacitors, and the like, and thin film transistors, capacitors, and the like may be implemented by these conductive layers and insulating layers.

The display panel 10 may include a liquid crystal display panel, an organic light-emitting display panel, or an inorganic light-emitting display panel, and the type of the display panel 10 is not particularly limited. The display panel 10 may be a rigid type or a flexible type that is rollable or foldable. A display module 140 may further include a supporter, a bracket, a heat dissipation member, or the like, which support the display panel 10.

The display panel 10 may include a display area DA and a peripheral area PA located outside (e.g., in a periphery or outside a footprint of) the display area DA. In FIG. 1, the display area DA is illustrated as having a rectangular shape, but the disclosure is not limited thereto. For example, the display area DA may have various shapes, such as a circle, an ellipse, a polygon, or a certain figure.

The display area DA is a portion in which an image is displayed, and a plurality of pixels PX may be arranged in the display area DA. Each of the pixels PX may include a display element, such as an organic light-emitting diode (OLED). For example, each of the pixels PX may emit red light, green light, or blue light. These pixels PX may be connected to a pixel circuit including a thin-film transistor (TFT), a storage capacitor, and the like. The pixel circuit may be connected to a scan line SL configured to transmit a scan signal, a data line DL crossing the scan line SL and configured to transmit a data signal, a driving voltage line PL configured to supply a driving voltage, and the like. The data line DL and the driving voltage line PL may extend in a y-axis direction (hereinafter, a first direction), and the scan line SL may extend in an x-axis direction (hereinafter, a second direction). Although FIG. 1 illustrates a single pixel PX, a single data line DL, a single scan line SL, and a single driving voltage line PL for convenience of illustration, as a person having ordinary skill in the art would appreciate, the display panel 10 may include any suitable number of pixels, data lines, scan lines, or driving voltage lines according to the design and size of the display panel 10.

The pixel PX may emit light of luminance corresponding to an electrical signal from the pixel circuit electrically connected to the pixel. The display area DA may display a certain image through light emitted from the pixel PX. For reference, the pixel PX may be defined as an emission area that emits any one of red light, green light, and blue light.

The peripheral area PA, which is an area in which the pixel PX is not arranged, may be an area in which an image is not displayed. A power supply wire configured to drive the pixel PX, and the like may be arranged in the peripheral area PA. According to some embodiments, pads may be arranged in the peripheral area PA, and the above-described pads may be electrically connected to a printed circuit board including a driving circuit unit, or an integrated circuit device, such as a driver IC, in the peripheral area PA.

For reference, the display panel 10 includes a substrate 100, and thus it may be construed as meaning that the substrate 100 has the display area DA and the peripheral area PA. Detailed description of the substrate 100 will be provided below.

According to some embodiments, a plurality of transistors may be arranged in the display area DA. In the plurality of transistors, depending on the type of transistor (N-type or P-type) and/or operating conditions, a first terminal of a transistor may be a source electrode or a drain electrode, and a second terminal of the transistor may be an electrode different from the first terminal. For example, in case that the first terminal is a source electrode, the second terminal may be a drain electrode.

For example, the plurality of transistors may include a driving transistor, a data writing transistor, a compensation transistor, an initialization transistor, an emission control transistor, and the like. The driving transistor may be connected between the driving voltage line PL and an OLED, and the data writing transistor may be connected to the data line DL and the driving transistor and perform a switching operation for transmitting a data signal received via the data line DL.

The compensation transistor may be turned on in response to a scan signal received via the scan line SL and connect the driving transistor to the OLED, thereby compensating for a threshold voltage of the driving transistor.

The initialization transistor may be turned on in response to a scan signal received via the scan line SL and transmit an initialization voltage to a gate electrode of the driving transistor, thereby initializing the gate electrode of the driving transistor. The scan line connected to the initialization transistor may be a separate scan line different from the scan line connected to the compensation transistor.

The emission control transistor may be turned on in response to an emission control signal received via the emission control line, and as a result, a driving current may flow through the OLED.

The OLED may include a pixel electrode (anode) and a counter electrode (cathode) and receive a required voltage from the pixel electrode (anode) and the counter electrode (cathode). The OLED may emit light by receiving a driving current from the driving transistor, thereby displaying an image.

Hereinafter, an organic light-emitting display device will be described as an example of the display device according to some embodiments of the present disclosure, but the display device of the disclosure is not limited thereto. According to some embodiments, the display device of the disclosure may be a display device, such as an inorganic light-emitting display (or inorganic EL display) or a quantum dot light-emitting display. For example, an emission layer of a display element included in the display device may include an organic material or an inorganic material. According to some embodiments, the display device may include an emission layer and quantum dots positioned on a path of light emitted from the emission layer.

Figure 2:
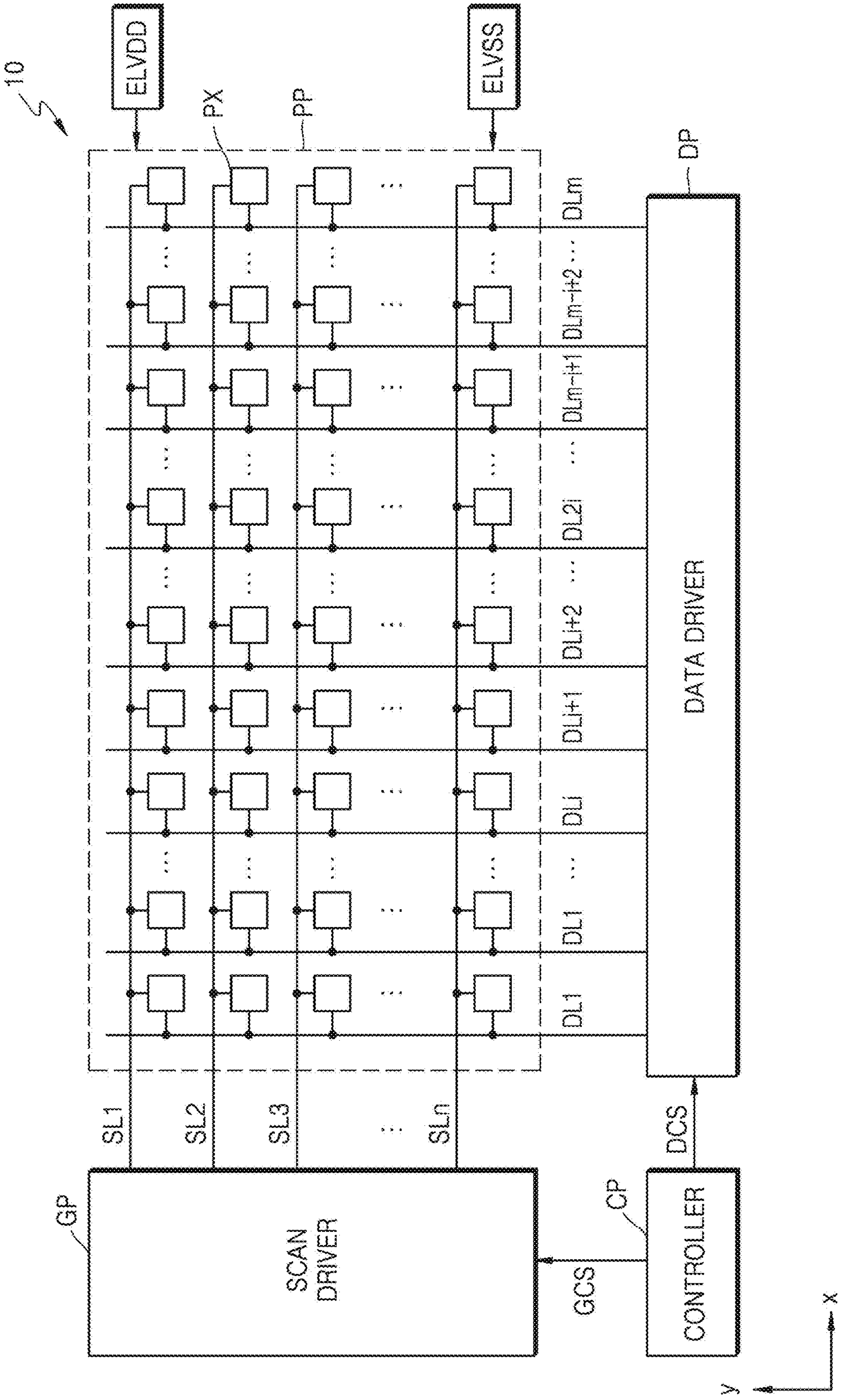
FIG. 2 is a schematic conceptual diagram of a display device according to an embodiment.

FIG. 2 is a schematic conceptual diagram of a display device according to some embodiments.

As illustrated in FIG. 2, the display device may include a pixel unit PP, a scan driver (or gate driving unit) GP, a data driver DP, and a controller CP.

In the display area DA, the pixel unit PP in which a plurality of pixels PX are arranged may be provided. In the peripheral area PA, the scan driver GP, the data driver DP, and the controller CP may be provided.

Each of the plurality of pixels PX may be connected to a corresponding scan line among a plurality of scan lines SL1 to SLn and a corresponding data line among a plurality of data lines DL1 to DLm. Each of the plurality of scan lines SL1 to SLn may extend in a first direction (e.g., x direction, row direction) and be connected to pixels PX located in the same row. Each of the plurality of scan lines SL1 to SLn may transmit a scan signal to pixels PX in the same row. Each of the plurality of data lines DL1 to DLm may extend in a second direction (e.g., y direction, column direction) and be connected to pixels PX located in the same column.

The scan driver GP may be connected to the plurality of scan lines SL1 to SLn, and may be configured to generate scan signals in response to a gate drive control signal GCS from the controller CP and sequentially supply the scan signals to the scan lines SL1 to SLn. In case that the scan signals are sequentially supplied to the scan lines SL1 to SLn, the pixels PX may be selected row by row. Each of the data lines DL1 to DLm may be configured to transmit a data signal DATA to the pixels PX of the selected row. The scan lines may be connected to gates of the transistors included in the pixels PX. The scan signal may be a gate control signal that controls the turn-on and turn-off of a transistor connected to a scan line. The scan signal may be a square wave signal that alternates between an on voltage at which a transistor may be turned on and an off voltage at which the transistor may be turned off.

The scan driver GP may be mounted on the display panel 10, as a driving chip. Also, the scan driver GP may be integrated into the display panel 10. For example, the scan driver GP may include an amorphous silicon TFT gate (ASG) driver circuit, a low temperature polycrystalline silicon (LTPS) TFT gate driver circuit, or an oxide semiconductor TFT gate (OSG) driver circuit, which are embedded in the display panel 10.

The data driver DP may be configured to convert a video signal into a data signal in the form of voltage or current according to a data drive control signal DCS input from the controller CP.

The controller CP may be configured to generate the data drive control signal DCS and the gate drive control signal GCS in response to externally supplied synchronization signals or clock signal. For example, the controller CP may be a controller 112-1 of FIG. 2 as described above, or may be a component including the controller 112-1. The controller CP may be configured to output the data drive control signal DCS to the data driver DP and output the gate drive control signal GCS to the scan driver GP.

The scan driver GP may be formed directly on a substrate. The data driver DP may be arranged on a flexible printed circuit board (FPCB) electrically connected to a pad arranged on one side of the substrate. According to some embodiments, the data driver DP may be arranged directly on a substrate in a chip on glass (COG) or chip on plastic (COP) manner.

According to some embodiments, the display device may further include an emission driver. For example, the emission driver may be connected to a plurality of emission control lines, and may be configured to generate emission signals in response to control signals received from the controller CP and sequentially supply the emission signals to emission control lines. In case that the emission signals are sequentially supplied to the emission control lines, the pixels PX may emit light sequentially. For example, the emission control line may be connected to a gate electrode of a transistor included in the pixel PX. For example, the emission signal may be a gate control signal that controls the turn-on and turn-off of a transistor connected to the emission control line. For example, the emission signal may be a square wave signal that alternates between an on voltage at which a transistor may be turned on and an off voltage at which the transistor may be turned off. In some embodiments, the emission driver may be formed separately from the scan driver GP, or may be integrated into the scan driver GP.

Figure 3:
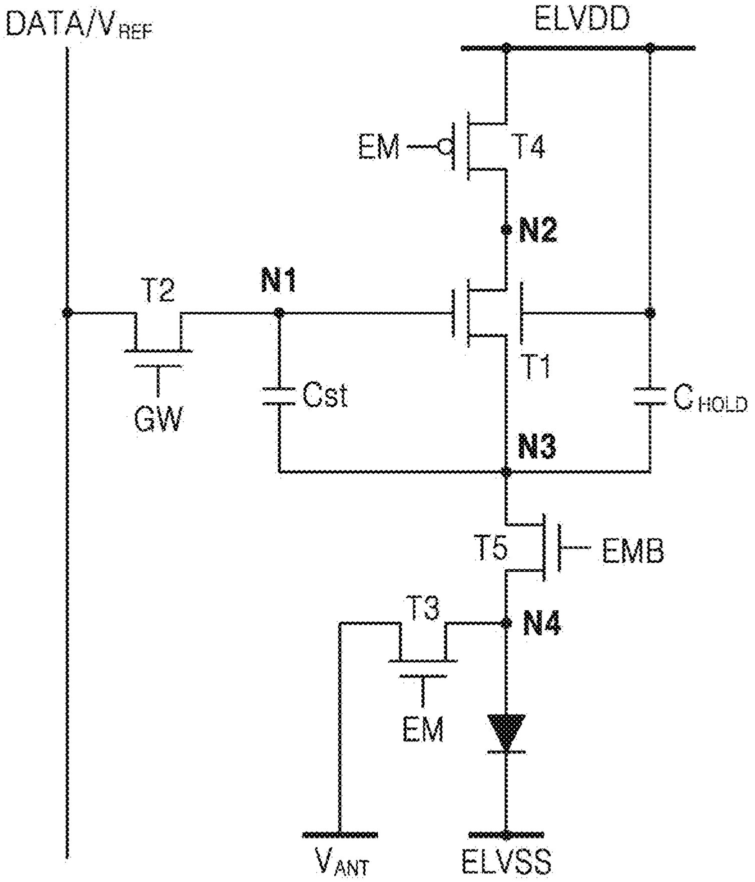
FIG. 3 is a circuit diagram of a pixel circuit according to an embodiment.

FIG. 3 is a circuit diagram of a pixel circuit according to some embodiments. Although FIG. 3 illustrates various components in a pixel circuit according to some embodiments, embodiments according to the present disclosure are not limited thereto, and according to various embodiments, the pixel circuit may include additional components or fewer components without departing from the spirit and scope of embodiments according to the present disclosure.

Referring to FIG. 3, the pixel circuit according to some embodiments may include a first transistor T1, a second transistor T2, a third transistor T3, a fourth transistor T4, a fifth transistor T5, a first capacitor Cst, a second capacitor Chold, and a light-emitting element.

According to some embodiments, the first transistor T1 may be referred to as a driving transistor.

According to some embodiments, the first transistor T1 may include a gate electrode connected to a first node N1, a first electrode connected to a second node N2, and a second electrode connected to a third node N3.

According to some embodiments, the first transistor T1 may be connected to the second transistor T2 at the first node N1. According to some embodiments, the first transistor T1 may be connected to the first capacitor Cst at the first node N1.

According to some embodiments, the first transistor T1 may be connected to the fourth transistor T4 at the second node N2.

According to some embodiments, the first transistor T1 may be connected to the fifth transistor T5 at the third node N3. According to some embodiments, the first transistor T1 may be connected to the first capacitor Cst at the third node N3.

According to some embodiments, the first transistor T1 may be connected to the second capacitor Chold at the third node N3.

According to some embodiments, the first transistor T1 may include a first gate electrode and a second gate electrode. For example, the first transistor T1 may be implemented as a transistor having a dual gate structure.

According to some embodiments, the first gate electrode of the first transistor T1 may be connected to the first node N1. For example, the first gate electrode of the first transistor T1 may be connected to the second transistor T2 or the first capacitor Cst at the first node N1.

According to some embodiments, the second gate electrode of the first transistor T1 may be configured to receive a first power voltage ELVDD. According to some embodiments, the second gate electrode of the first transistor T1 may be connected to a first electrode of the second capacitor Chold.

According to some embodiments, the second transistor T2 may include a gate electrode configured to receive a gate signal GW, a first electrode configured to receive a reference voltage Vref or a data signal DATA, and a second electrode connected to the first node N1.

According to some embodiments, the second transistor T2 may be configured to receive the reference voltage Vref or the data signal DATA through a single line. For example, the second transistor T2 may be configured to receive the reference voltage Vref and transmit the received reference voltage Vref to the first node N1, in the initialization period, and may be configured to receive the data signal DATA and transmit the received data signal DATA to the first node N1, in the date writing period, as described below.

According to some embodiments, the second transistor T2 may be connected to the gate electrode of the first transistor T1 at the first node N1. According to some embodiments, the second transistor T2 may be connected to the first capacitor Cst at the first node N1.

According to some embodiments, the third transistor T3 may include a gate electrode configured to receive a first emission signal EM, a first electrode configured to receive an initialization voltage Vaint, and a second electrode connected to a fourth node N4.

According to some embodiments, the third transistor T3 may be connected to a second electrode of the fifth transistor T5 at the fourth node N4. According to some embodiments, the third transistor T3 may be connected to the light-emitting element at the fourth node N4.

According to some embodiments, the fourth transistor T4 may include a gate electrode configured to receive the first emission signal EM, a first electrode configured to receive the first power voltage ELVDD, and a second electrode connected to the second node N2.

According to some embodiments, the fourth transistor T4 may be connected to the first electrode of the first transistor T1 at the second node N2.

According to some embodiments, the fifth transistor T5 may include a gate electrode configured to receive a second emission signal EMB, a first electrode connected to the third node N3, and a second electrode connected to the fourth node N4.

According to some embodiments, the fifth transistor T5 may be connected to the second electrode of the first transistor T1 at the third node N3. According to some embodiments, the fifth transistor T5 may be connected to a second electrode of the first capacitor Cst at the third node N3. According to some embodiments, the fifth transistor T5 may be connected to a second electrode of the second capacitor Chold at the third node N3.

According to some embodiments, the fifth transistor T5 may be connected to the second electrode of the third transistor T3 at the fourth node N4. According to some embodiments, the fifth transistor T5 may be connected to a first electrode of the light-emitting element at the fourth node N4.

According to some embodiments, the first capacitor Cst may include a first electrode connected to the first node N1 and a second electrode connected to the third node N3.

According to some embodiments, the first capacitor Cst may be connected to the gate electrode of the first transistor T1 at the first node N1. According to some embodiments, the first capacitor Cst may be connected to the second electrode of the second transistor T2 at the first node N1.

According to some embodiments, the first capacitor Cst may be connected to the second electrode of the first transistor T1 at the third node N3. According to some embodiments, the first capacitor Cst may be connected to the first electrode of the fifth transistor T5 at the third node N3. According to some embodiments, the first capacitor Cst may be connected to a second electrode of the second capacitor Chold at the third node N3.

According to some embodiments, the second capacitor Chold may include a first electrode connected to the first power voltage ELVDD and a second electrode connected to the third node N3.

According to some embodiments, the first electrode of the second capacitor Chold may be connected to one of the gate electrodes of the first transistor T1.

According to some embodiments, the second capacitor Chold may be connected to the second electrode of the first transistor T1 at the third node N3.

According to some embodiments, the second capacitor Chold may be connected to the first electrode of the fifth transistor T5 at the third node N3. According to some embodiments, the second capacitor Chold may be connected to the first electrode of the first capacitor Cst at the third node N3.

According to some embodiments, the light-emitting element may include a first electrode connected to the fourth node N4 and a second electrode configured to receive a second power voltage ELVSS.

According to some embodiments, the light-emitting element may be connected to the second electrode of the fifth transistor T5 at the fourth node N4.

According to some embodiments, the light-emitting element may be connected to the second electrode of the third transistor T3 at the fourth node N4.

According to some embodiments, the first transistor T1, the second transistor T2, the third transistor T3, the fourth transistor T4, and the fifth transistor T5 may be implemented as any one of an N-channel metal oxide semiconductor (NMOS) transistor and a P-channel metal oxide semiconductor (PMOS) transistor.

According to some embodiments, the first transistor T1, the second transistor T2, the third transistor T3, and the fifth transistor T5 may be NMOS transistors. As described below, a low voltage level may be an inactivation level, and a high voltage level may be an activation level. For example, in case that a signal applied to a control electrode of an NMOS transistor has a low voltage level, the NMOS transistor may be turned off. For example, in case that a signal applied to a control electrode of an NMOS transistor has a high voltage level, the NMOS transistor may be turned on. For convenience of explanation, hereinafter, a signal having a low voltage level will be referred to as a low signal, and a signal having a high voltage level will be referred to as a high signal.

According to some embodiments, the fourth transistor T4 may be a PMOS transistor. According to some embodiments, the low voltage level may be an activation level, and the high voltage level may be an inactivation level. For example, in case that a signal applied to a control electrode of a PMOS transistor has a low voltage level, the PMOS transistor may be turned on. For example, in case that a signal applied to a control electrode of a PMOS transistor has a high voltage level, the PMOS transistor may be turned off.

According to some embodiments, the fourth transistor T4 may be a transistor manufactured by a low-temperature polycrystalline silicon (LTPS) process.

The disclosure is not limited to the circuit diagram as illustrated in FIG. 3. For example, at least some of the first, second, third and fifth transistors T1, T2, T3, and T5 may be implemented as PMOS transistors. According to some embodiments, the fourth transistor T4 may be implemented as an NMOS transistor.

Figure 4:
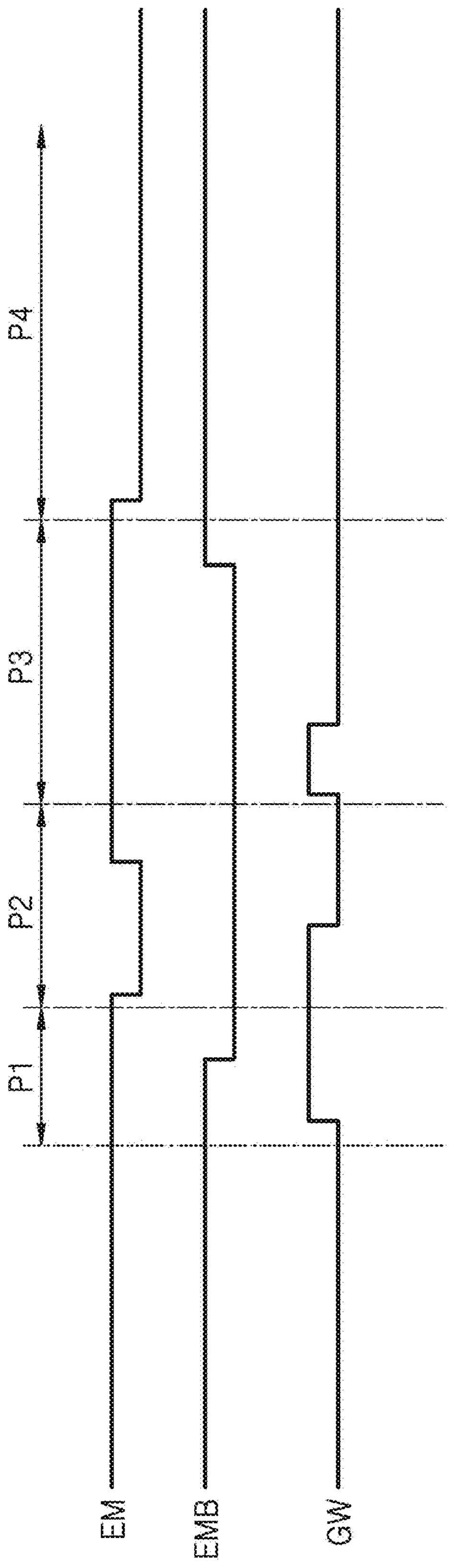
FIGS. 4 to 6 are timing diagrams illustrating examples of input signals applied to a pixel circuit according to an embodiment.
Figure 5:
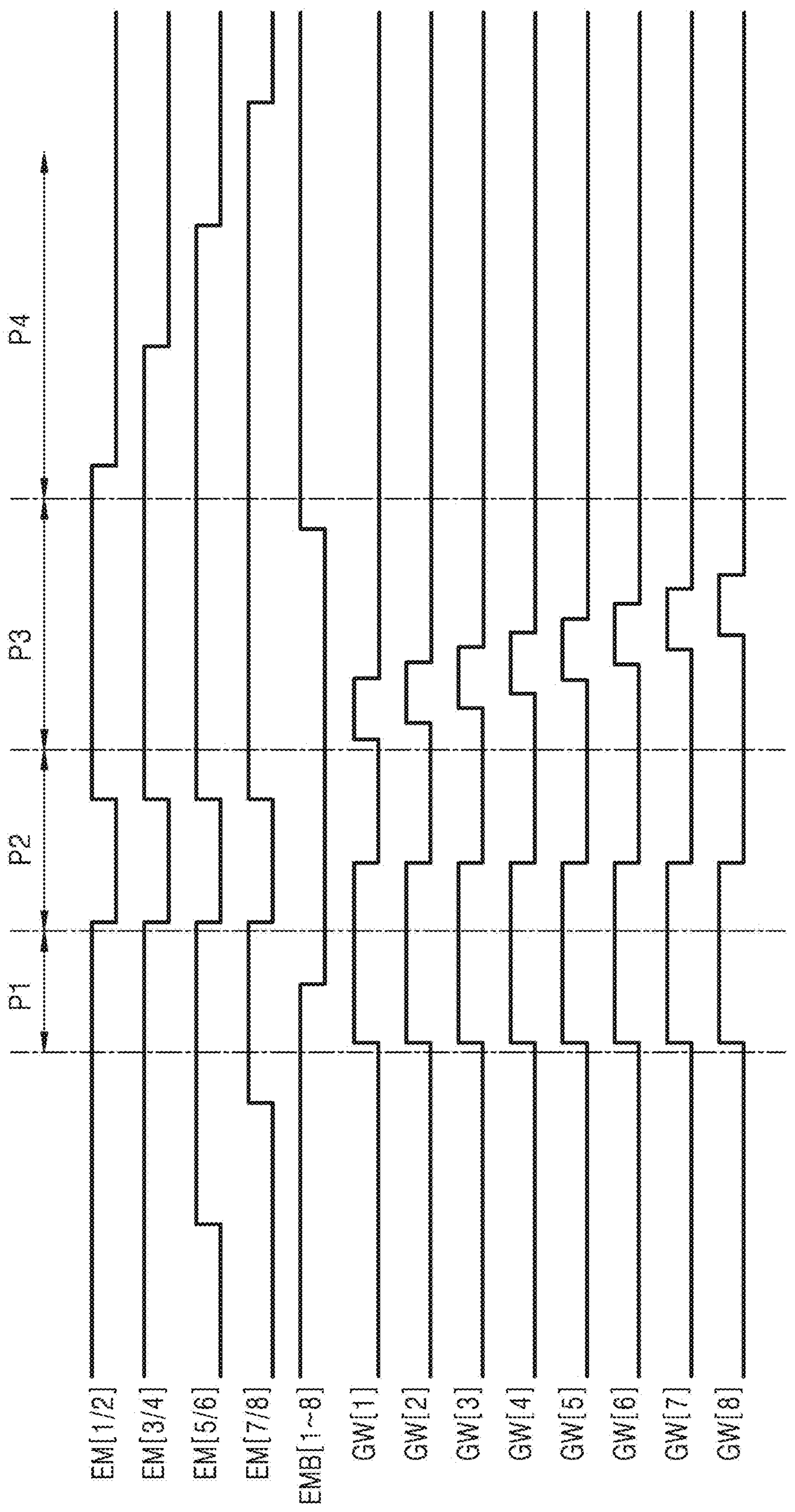
Figure 6:
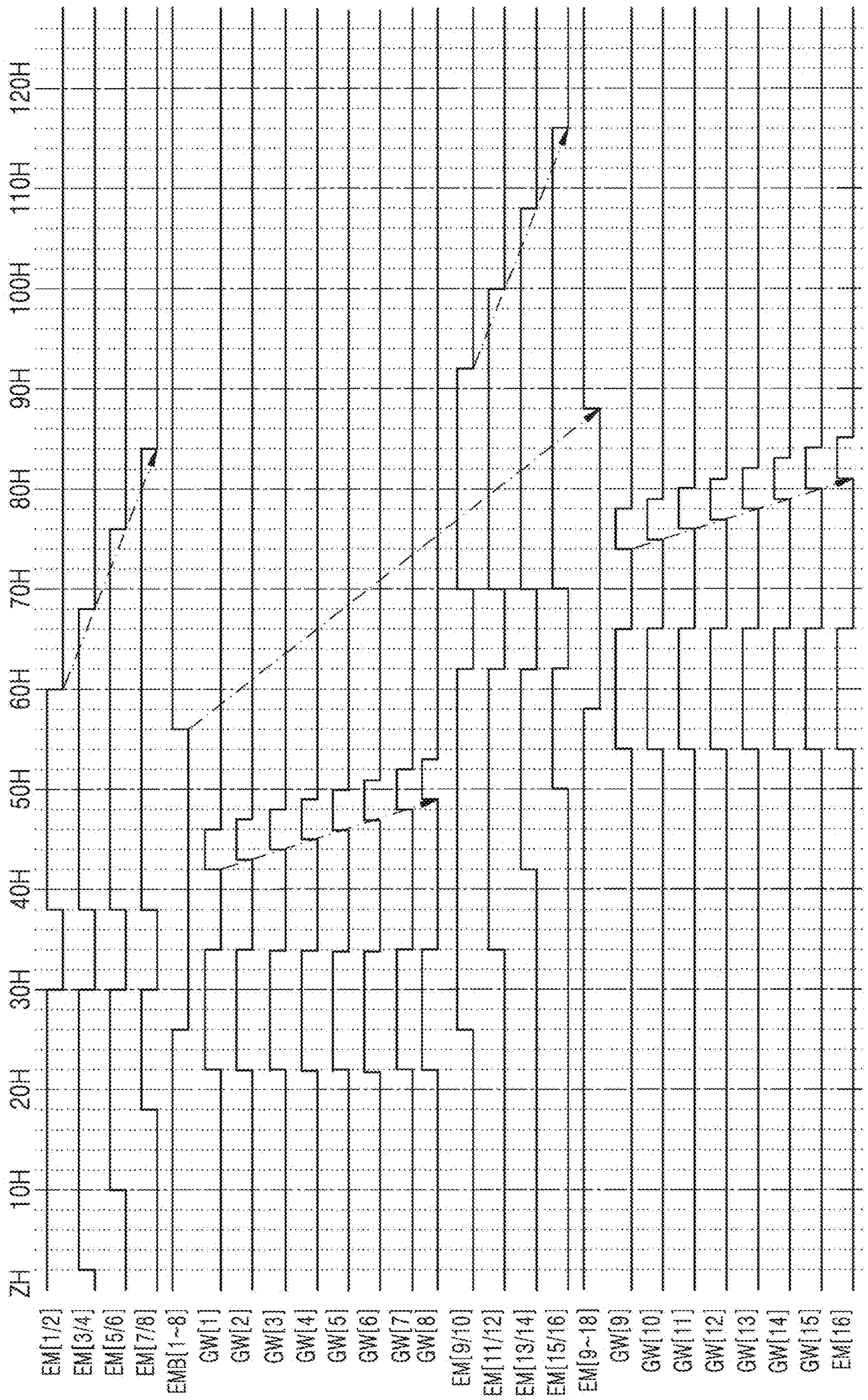

FIGS. 4 to 6 are timing diagrams illustrating examples of input signals applied to a pixel circuit according to some embodiments.

Referring to FIG. 4, the pixel circuit according to some embodiments of the present disclosure may be controlled on the basis of the gate signal GW, the first emission signal EM, and the second emission signal EMB.

According to some embodiments, the operation of the pixel circuit may be divided into a first period P1, a second period P2, a third period P3, and a fourth period P4 on the basis of signal states of the gate signal GW, the first emission signal EM, and the second emission signal EMB. In this regard, the signal states of the gate signal GW, the first emission signal EM, and the second emission signal EMB may be any one selected from a high signal, which is a signal having a relatively high level, and a low signal, which is a signal having a level lower than the high signal.

According to some embodiments, the first period P1 may be referred to as an initialization period. According to some embodiments, in the first period P1, the first emission signal EM may be a high signal, the second emission signal EMB may be a high signal or a signal that changes from a high signal to a low signal, and the gate signal GW may be a high signal or a signal that changes from a low signal to a high signal.

According to some embodiments, in the first period P1, the fourth transistor T4 may be turned off in response to the first emission signal EM being a high signal, and the third transistor T3 may be turned on in response to the first emission signal EM being a high signal. According to some embodiments, the initialization voltage Vaint may be supplied to the fourth node N4 on the basis of the third transistor T3 being turned on.

According to some embodiments, in the first period P1, the fifth transistor T5 may be in a turned-on state on the basis of the second emission signal EMB being a high signal. According to some embodiments, in the first period P1, the fifth transistor T5 may change from a turned-on state to a turned-off state on the basis of the second emission signal EMB changing from a high signal to a low signal.

According to some embodiments, in the first period P1, the second transistor T2 may be in a turned-on state on the basis of the gate signal GW being a high signal. According to some embodiments, in the first period P1, the second transistor T2 may change from a turned-off state to a turned-on state on the basis of the gate signal GW changing from a low signal to a high signal. According to some embodiments, in the first period P1, the reference voltage Vref may be supplied to the first node N1 on the basis of the second transistor T2 being turned on.

According to some embodiments, the second period P2 may be referred to as a compensation period. According to some embodiments, in the second period P2, the first emission signal EM may be a low signal or a signal that changes from a low signal to a high signal, the second emission signal EMB may be a low signal, and the gate signal GW may be a high signal or a signal that changes from a high signal to a low signal.

According to some embodiments, in the second period P2, the fourth transistor T4 may be turned on on the basis of the first emission signal EM being a low signal. According to some embodiments, the first power voltage ELVDD may be supplied to the first electrode of the first transistor T1 on the basis of the fourth transistor T4 being turned on.

According to some embodiments, in the second period P2, the fifth transistor T5 may be turned off on the basis of the second emission signal EMB being a low signal. According to some embodiments, in the second period P2, the second transistor T2 may be turned on on the basis of the gate signal GW being a high signal. According to some embodiments, a threshold voltage Vth of the first transistor T1 may be compensated for on the basis of the fourth transistor T4 being turned on, the second transistor T2 being turned on, and the fifth transistor T5 being turned on.

According to some embodiments, the third period P3 may be referred to as a data writing period. According to some embodiments, in the third period P3, the first emission signal EM may be a high signal, the second emission signal EMB may be a low signal or a signal that changes from a low signal to a high signal, and the gate signal GW may be a high signal or a signal that changes from a low signal to a high signal and then changes back to a low signal.

According to some embodiments, in the third period P3, the fourth transistor T4 may be turned off in response to the first emission signal EM being a high signal, and the third transistor T3 may be turned on in response to the first emission signal EM being a high signal.

According to some embodiments, in the third period P3, the fifth transistor T5 may be turned off on the basis of the second emission signal EMB being a low signal.

According to some embodiments, in the third period P3, the second transistor T2 may be in a turned-on state on the basis of the gate signal GW being a high signal. According to some embodiments, in the third period P3, the second transistor T2 may change from a turned-off state to a turned-on state on the basis of the gate signal GW changing from a low signal to a high signal. According to some embodiments, in the third period P3, the data signal DATA may be supplied to the first node N1 on the basis of the second transistor T2 being turned on.

According to some embodiments, the fourth period P4 may be referred to as an emission period. According to some embodiments, in the fourth period P4, the first emission signal EM may be a low signal or a signal that changes from a high signal to a low signal, the second emission signal EMB may be a high signal, and the gate signal GW may be a low signal.

According to some embodiments, in the fourth period P4, the fourth transistor T4 may be turned on on the basis of the first emission signal EM being a low signal. According to some embodiments, in the fourth period P4, the fifth transistor T5 may be turned on on the basis of the second emission signal EMB being a high signal. According to some embodiments, the first transistor T1 may be turned on on the basis of the fourth transistor T4 and the fifth transistor T5 being turned on.

According to some embodiments, on the basis of the first transistor T1 being turned on, the first power voltage ELVDD may be applied to the first transistor T1 to generate a driving current, and the driving current may be applied to the light-emitting element. According to some embodiments, the light-emitting element may emit light at a brightness corresponding to the driving current.

It can be understood that FIG. 4 illustrates an example of input signals applied to a single pixel circuit, and FIGS. 5 and 6 illustrate examples of input signals applied to a plurality of pixel circuits.

Referring to FIGS. 5 and 6, the plurality of pixel circuits according to some embodiments of the present disclosure may be controlled on the basis of the same input signals.

According to some embodiments, 2*n* pixel circuits may be controlled on the basis of the same input signals. According to some embodiments, at least some of the scan driver, the data driver, and the emission driver may control 2*n* pixel circuits on the basis of the same input signals. In the timing diagram illustrated in FIG. 5, a total of eight pixel circuits are illustrated as being controlled on the basis of the same input signals, but this should be understood as an example.

According to some embodiments, in the initialization period P1 and the compensation period P2, the scan driver may simultaneously (or concurrently) transmit scan signals (or gate signals GW) to a plurality of pixel circuits. Referring to FIG. 5, GW[1] to GW[8] are illustrated as the same high signals in both the initialization period P1 and the compensation period P2. According to some embodiments, the scan driver may sequentially transmit scan signals (or gate signals GW) to a plurality of pixel circuits in the data writing period P3. According to some embodiments, data may be sequentially written to pixel circuits respectively connected to GW[1] to GW[8] on the basis of GW[1] to GW[8] sequentially changing to high signals.

According to some embodiments, the emission driver may simultaneously (or concurrently) transmit the first emission signal EM to a plurality of pixel circuits in the initialization period P1 and the compensation period P2. Referring to FIG. 5, EM[1/2] to EM[3/4] are illustrated as the same high signals in both the initialization period P1 and the compensation period P2. According to some embodiments, the emission driver may sequentially transmit the first emission signal EM to a plurality of pixel circuits in the emission period P4. According to some embodiments, pixel circuits respectively connected to EM[1/2] to EM[3/4] may sequentially emit light on the basis of EM[1/2] to EM[3/4] sequentially changing to low signals.

According to some embodiments, the emission driver may simultaneously (or concurrently) transmit the second emission signal EMB to a plurality of pixel circuits in the initialization period P1 to the emission period P4. Referring to FIG. 5, EMB[1-8] are illustrated as the same signals in the entire operation period, for example, the initialization period P1 to the emission period P4.

According to some embodiments, referring to FIG. 6, after data writing for a first group (e.g., 8 pixel circuits as a unit) is completed, the scan driver may transmit gate signals to a second group (e.g., 8 pixel circuits as another unit). A display device and/or an electronic device including a scan driver according to some embodiments may enable high-speed operation compared to performing timing shift for each line.

Figure 7:
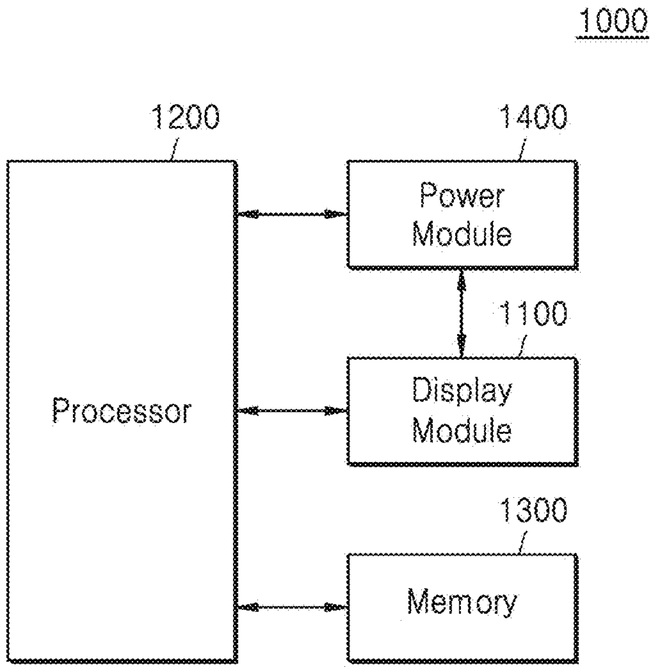
FIG. 7 is a block diagram of an electronic device according to an embodiment.

FIG. 7 is a block diagram of an electronic device 1000 according to some embodiments.

The display device according to the embodiments described herein may be applied to various electronic devices. The electronic device according to some embodiments may include the above-described display device, and may further include a module or device having additional functions other than the display device.

Referring to FIG. 7, the electronic device 1000 according to some embodiments may include a display module 1100, a processor 1200, a memory 1300, and a power module 1400.

The processor 1200 may include at least one of a central processing unit (CPU), an application processor (AP), a graphic processing unit (GPU), a communication processor (CP), an image signal processor (ISP), or a controller.

The memory 1300 may store data information required for operation of the processor 1200 or the display module 1100. In case that the processor 1200 executes an application stored in the memory 1300, an image data signal and/or an input control signal may be transmitted to the display module 1100, and the display module 1100 may process the received signal and output image information through a display screen.

The power module 1400 may include a power supply module, such as a power adapter or a battery device, and a power conversion module configured to convert power supplied by the power supply module to generate power required for operation of the electronic device 1000.

At least one of the components of the electronic device 1000 as described above may be included in the display device according to the above-described embodiments. According to some embodiments, some of the individual modules functionally included in a single module may be included in the display device, and others thereof may be provided separately from the display device. For example, the display device may include the display module 1100, and the processor 1200, the memory 1300, and the power module 1400 may be provided in the form of other devices in the electronic device 1000, not in the display device.

Figure 8:
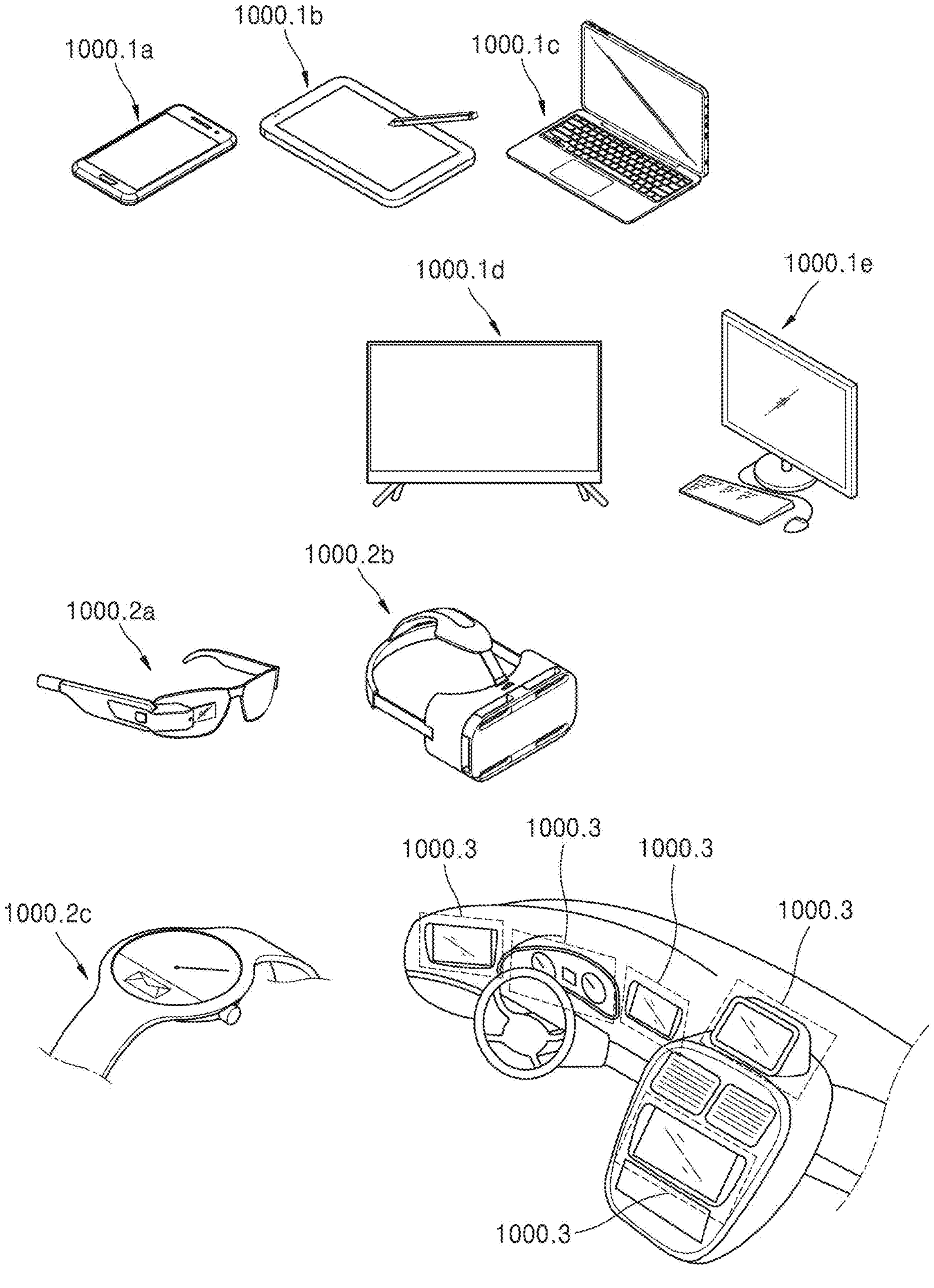
FIG. 8 illustrates schematic views of electronic devices according to various embodiments.

FIG. 8 illustrates schematic views of electronic devices according to various embodiments.

Referring to FIG. 8, various electronic devices according to embodiments, to which the display device is applied, may include: electronic devices for displaying an image, such as an smartphone 1000.1*a*, a tablet PC 1000.1*b*, a laptop 1000.1*c*, a TV 1000.1*d*, and a desktop monitor 1000.1*e*; wearable electronic devices including display modules such as smart glasses 1000.2*a*, a head-mounted display 1000.2*b*, and a smart watch 1000.2*c*; electronic devices 1000.3 for a vehicle, including display modules such as a center information display (CID) positioned in an automobile instrument panel, a center fascia, and a dashboard, and a room mirror display.

A display device and/or electronic device including a pixel circuit according to some embodiments of the disclosure may display a high-resolution image.

However, the characteristics of embodiments according to the present disclosure are not limited to the characteristics described above, and may be expanded in various ways without departing from the spirit and scope of embodiments according to the present disclosure.

Embodiments described above may be implemented independently, but a structure of each embodiment may be applied in combination to other embodiments.

The disclosure has been described with reference to the embodiments illustrated in the drawings, but the embodiments are only examples and it will be understood by one of ordinary skill in the art that various modifications and equivalent embodiments can be made therefrom. Thus, the true technical scope of the disclosure should be defined by the technical idea of the appended claims.

Certain executions described in embodiments do not limit the scope of embodiments according to the present disclosure. Also, elements described herein may not be essential elements for application of the disclosure unless the elements are particularly described as being "essential" or "critical."

The term "the" and similar referential terms in the specification (specifically in the claims) of an embodiment may be used for both the singular and the plural. Further, when a range is described according to some embodiments, the disclosure includes inventions to which individual values belonging to the range are applied (unless otherwise stated), and it is considered that each individual value constituting the range is described in the detailed description. Lastly, unless an order is clearly stated or unless otherwise stated, operations of a method according to some embodiments may be performed in an appropriate order. Embodiments are not necessarily limited by the stated order of the operations. All terms as used with respect to the disclosed embodiments are merely for describing the embodiments in detail and the scope of the embodiments is not limited by those terms unless defined in the claims. Also, various modifications, combinations, and changes may be made according to design conditions and factors within the scope of the appended claims or equivalents thereto.

What is claimed is:

1. A pixel circuit comprising:

a first transistor comprising a gate electrode connected to a first node, a first electrode connected to a second node, and a second electrode connected to a third node;

a second transistor comprising a gate electrode configured to receive a gate signal, a first electrode configured to receive a reference voltage or a data signal, and a second electrode connected to the first node;

a third transistor comprising a gate electrode configured to receive a first emission signal, a first electrode configured to receive an initialization voltage, and a second electrode connected to a fourth node;

a fourth transistor comprising a gate electrode configured to receive the first emission signal, a first electrode configured to receive a first power voltage, and a second electrode connected to the second node;

a fifth transistor comprising a gate electrode configured to receive a second emission signal, a first electrode connected to the third node, and a second electrode connected to the fourth node;

a first capacitor comprising a first electrode connected to the first node and a second electrode connected to the third node;

a second capacitor comprising a first electrode connected to the first power voltage and a second electrode connected to the third node; and a light-emitting element comprising a first electrode connected to the fourth node and a second electrode configured to receive a second power voltage.

2. The pixel circuit of claim 1, wherein the first transistor comprises a first gate electrode connected to the first node and a second gate electrode configured to receive the first power voltage.

3. The pixel circuit of claim 1, wherein the second transistor is configured to receive a reference voltage or a data signal through a single line.

4. The pixel circuit of claim 1, wherein the first transistor, the second transistor, the third transistor, and the fifth transistor are N-channel metal oxide semiconductor (NMOS) transistors, and the fourth transistor is a P-channel metal oxide semiconductor (PMOS) transistor.

5. The pixel circuit of claim 1, wherein the gate signal is a high signal at time points at which the second transistor receives the reference voltage and the data signal.

6. The pixel circuit of claim 1, wherein, at a time point at which the light-emitting element emits light, the first emission signal is a low signal, and the second emission signal is a high signal.

7. A display device comprising:

a scan driver configured to transmit a plurality of scan signals to a plurality of scan lines;

a data driver configured to transmit a plurality of data signals to a plurality of data lines;

an emission driver configured to transmit a plurality of emission signals to a plurality of emission control lines; and a pixel unit comprising a plurality of pixel circuits, wherein each of the plurality of pixel circuits are configured to emit light according to a corresponding data signal to display an image, the pixel circuit comprising:

a first transistor comprising a gate electrode connected to a first node, a first electrode connected to a second node, and a second electrode connected to a third node;

a second transistor comprising a gate electrode configured to receive a gate signal, a first electrode configured to receive a reference voltage or a data signal, and a second electrode connected to the first node;

a third transistor comprising a gate electrode configured to receive a first emission signal, a first electrode configured to receive an initialization voltage, and a second electrode connected to a fourth node;

a fourth transistor comprising a gate electrode configured to receive the first emission signal, a first electrode configured to receive a first power voltage, and a second electrode connected to the second node;

a fifth transistor comprising a gate electrode configured to receive a second emission signal, a first electrode connected to the third node, and a second electrode connected to the fourth node;

a first capacitor comprising a first electrode connected to the first node and a second electrode connected to the third node;

a second capacitor comprising a first electrode connected to the first power voltage and a second electrode connected to the third node; and a light-emitting element comprising a first electrode connected to the fourth node and a second electrode configured to receive a second power voltage.

8. The display device of claim 7, wherein the scan driver is configured to:

simultaneously transmit the scan signals to the plurality of pixel circuits in an initialization period and a compensation period; and sequentially transmit the scan signals to the plurality of pixel circuits in a data writing period.

9. The display device of claim 7, wherein the emission driver is configured to:

simultaneously transmit the first emission signal to the plurality of pixel circuits in an initialization period and a compensation period and to sequentially transmit the first emission signal to the plurality of pixel circuits in an emission period; and simultaneously transmit the second emission signal to the plurality of pixel circuits.

10. The display device of claim 7, wherein the first transistor comprises a first gate electrode connected to the first node and a second gate electrode configured to receive the first power voltage.

11. The display device of claim 7, wherein the second transistor is configured to receive the reference voltage or the data signal through a single line.

12. The display device of claim 7, wherein the first transistor, the second transistor, the third transistor, and the fifth transistor are N-channel metal oxide semiconductor (NMOS) transistors, and the fourth transistor is a P-channel metal oxide semiconductor (PMOS) transistor.

13. The display device of claim 7, wherein the gate signal is a high signal at time points at which the second transistor receives the reference voltage and the data signal.

14. The display device of claim 7, wherein, at a time point at which the light-emitting element emits light, the first emission signal is a low signal, and the second emission signal is a high signal.

15. An electronic device comprising:

at least one memory;

at least one processor configured to execute an application stored in the at least one memory; and a display module configured to process an image data signal and output image information, wherein the display module comprises at least one pixel circuit, wherein the at least one pixel circuit each comprises:

a first transistor comprising a gate electrode connected to a first node, a first electrode connected to a second node, and a second electrode connected to a third node;

a second transistor comprising a gate electrode configured to receive a gate signal, a first electrode configured to receive a reference voltage or a data signal, and a second electrode connected to the first node;

a third transistor comprising a gate electrode configured to receive a first emission signal, a first electrode configured to receive an initialization voltage, and a second electrode connected to a fourth node;

a fourth transistor comprising a gate electrode configured to receive the first emission signal, a first electrode configured to receive a first power voltage, and a second electrode connected to the second node;

a fifth transistor comprising a gate electrode configured to receive a second emission signal, a first electrode connected to the third node, and a second electrode connected to the fourth node;

a first capacitor comprising a first electrode connected to the first node and a second electrode connected to the third node;

a second capacitor comprising a first electrode connected to the first power voltage and a second electrode connected to the third node; and a light-emitting element comprising a first electrode connected to the fourth node and a second electrode configured to receive a second power voltage.

16. The electronic device of claim 15, wherein the first transistor comprises a first gate electrode connected to the first node and a second gate electrode configured to receive the first power voltage.

17. The electronic device of claim 15, wherein the second transistor is configured to receive a reference voltage or a data signal through a single line.

18. The electronic device of claim 15, wherein the first transistor, the second transistor, the third transistor, and the fifth transistor are N-channel metal oxide semiconductor (NMOS) transistors, and the fourth transistor is a P-channel metal oxide semiconductor (PMOS) transistor.

19. The electronic device of claim 15, wherein the gate signal is a high signal at time points at which the second transistor receives the reference voltage and the data signal.

20. The electronic device of claim 15, wherein, at a time point at which the light-emitting element emits light, the first emission signal is a low signal and the second emission signal is a high signal.

* * * * *